(12) United States Patent
Zhou et al.

(10) Patent No.: US 7,238,331 B2
(45) Date of Patent: Jul. 3, 2007

(54) PROCESS FOR PRODUCING NANO-POWDERS AND POWDERS OF NANO-PARTICLE LOOSE AGGREGATE

(75) Inventors: Yingyan Zhou, Liaoning (CN); Shoushan Gao, Liaoning (CN); Kaiming Wang, Liaoning (CN); Chuangeng Wen, Liaoning (CN); Xiaoqi Li, Liaoning (CN)

(73) Assignee: Anshan University of Science and Technology, Liaoning (CN)

(*) Notice: Subject to any disclaimer, the term of this patent is extended or adjusted under 35 U.S.C. 154(b) by 170 days.

(21) Appl. No.: 10/484,057

(22) PCT Filed: Jul. 26, 2002

(86) PCT No.: PCT/CN02/00521

§ 371 (c)(1),
(2), (4) Date: Aug. 13, 2004

(87) PCT Pub. No.: WO03/011761

PCT Pub. Date: Feb. 13, 2003

(65) Prior Publication Data

US 2004/0253170 A1    Dec. 16, 2004

(30) Foreign Application Priority Data

Jul. 27, 2001    (CN) ................................ 01 1 27978

(51) Int. Cl.
*C01G 1/00*    (2006.01)

(52) U.S. Cl. .................... 423/1; 423/592.1; 423/608; 423/622; 423/430; 423/431; 423/85; 423/101; 423/158; 423/165; 423/462; 423/491; 423/299; 423/561.1; 423/511; 977/773; 977/775; 977/777; 75/343; 75/370

(58) Field of Classification Search .................... 423/1, 423/592.1, 608, 622, 430, 431, 85, 101, 158, 423/165, 462, 491, 299, 561.1, 511; 977/773, 977/775, 777; 75/343, 370
See application file for complete search history.

(56) References Cited

U.S. PATENT DOCUMENTS

| 5,417,956 | A  | * | 5/1995 | Moser .................... 423/592.1 |
| 6,162,530 | A  |   | 12/2000 | Xiao et al. |
| 6,503,475 | B1 | * | 1/2003 | McCormick et al. .... 423/592.1 |
| 6,858,381 | B2 | * | 2/2005 | Ichikawa et al. ........... 430/569 |
| 2004/0115123 | A1 |   | 6/2004 | Zhou et al. |

FOREIGN PATENT DOCUMENTS

| CN | 1209789 | 3/1999 |
| CN | 1258639 | 7/2000 |
| CN | 1296916 | 5/2001 |
| CN | 1300243 | 6/2001 |
| WO | 99/59754 | 11/1999 |

\* cited by examiner

*Primary Examiner*—Timothy C. Vanoy
(74) *Attorney, Agent, or Firm*—Knobbe, Martens, Olson & Bear LLP

(57) ABSTRACT

The present invention discloses a process for producing nano-powders and powders of nano-particle loose aggregate, which includes: (a) providing at least two reactant solutions A and B capable of rapidly reacting to form deposits; (b) supplying the at least two reactant solutions A and B at least at the reaction temperature into a mixing and reaction precipitator respectively, in which mixing reaction and precipitation are continuously carried out in sequence, the mixing and reaction precipitator being selected from at least one of a tubular ejection mixing reactor, a tubular static mixing reactor and an atomization mixing reactor; and (c) treating the deposit-containing slurry continuously discharged from the mixing reaction precipitator.

46 Claims, 8 Drawing Sheets

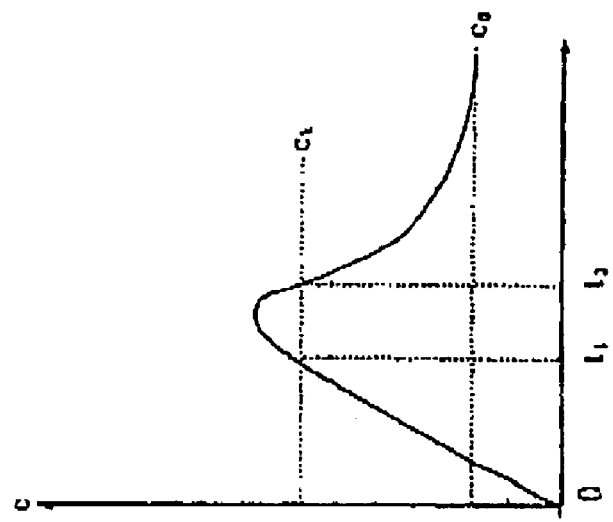
Fig.1-c
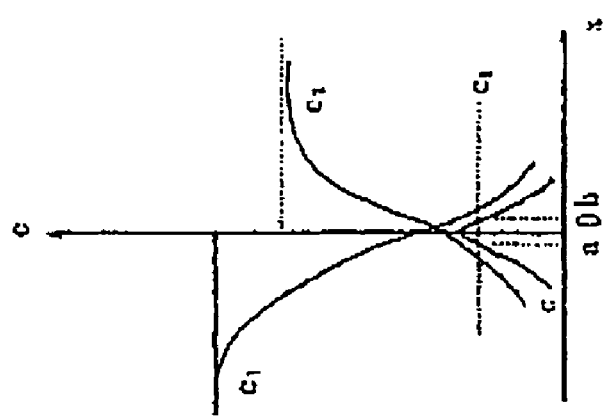
Fig.1-b
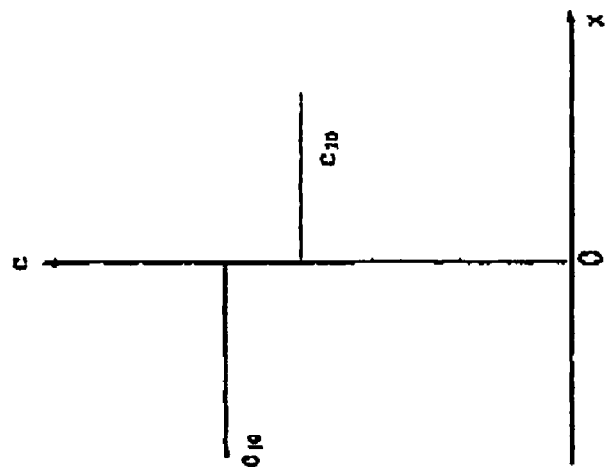
Fig.1-a

Fig.3-a
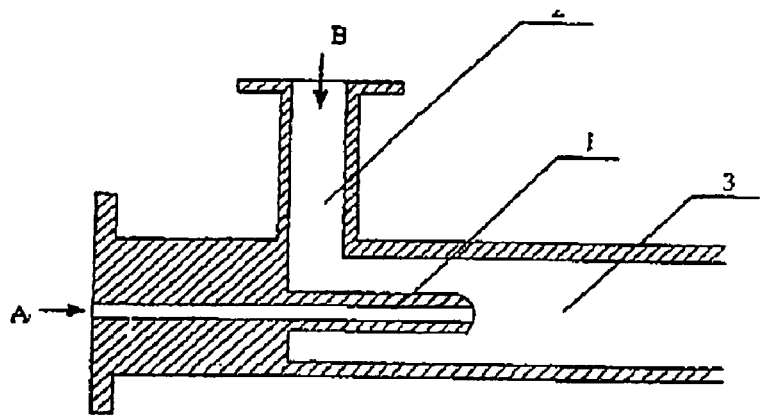
Fig.3-b
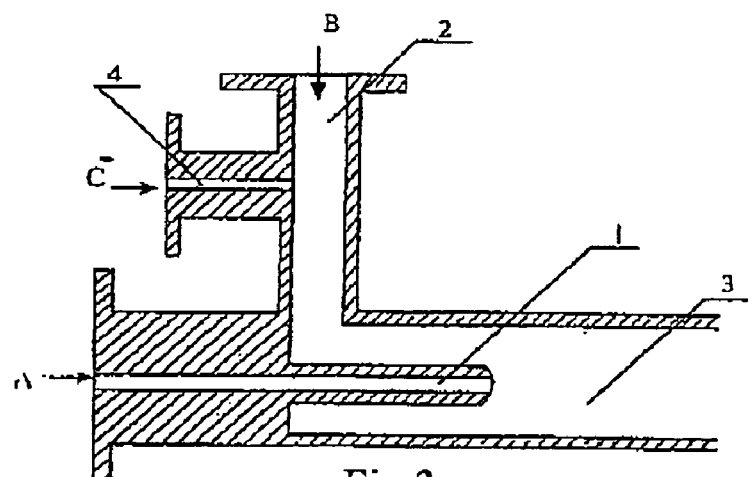
Fig.3-c
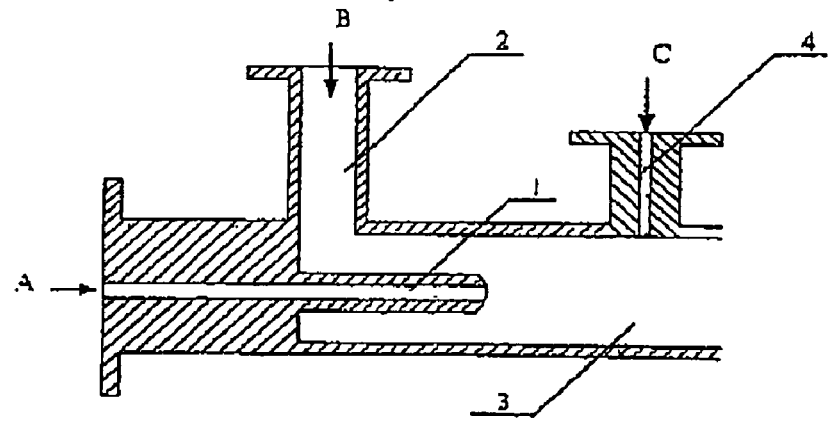

Fig.4-a
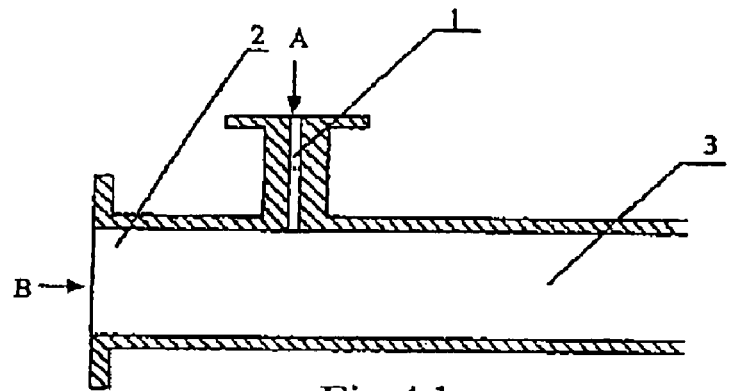
Fig.4-b
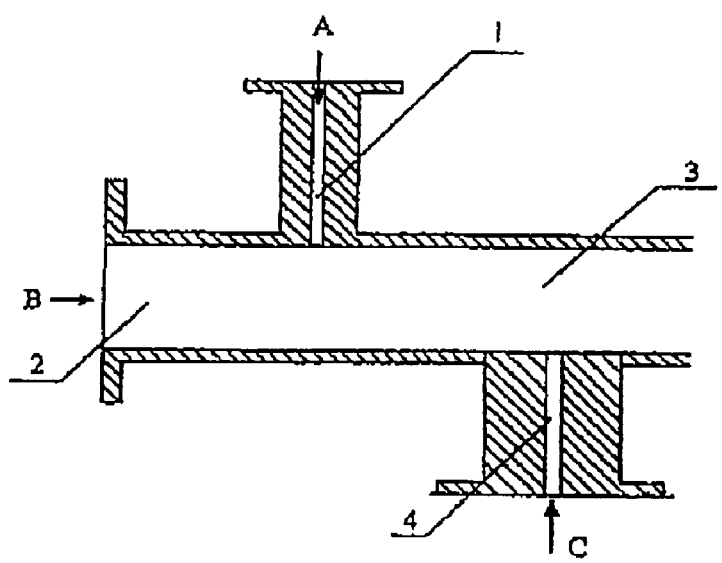
Fig.4-c
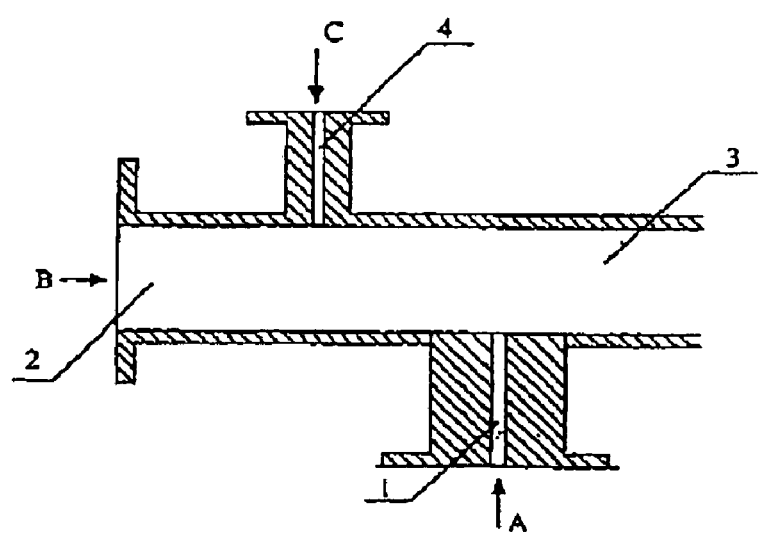

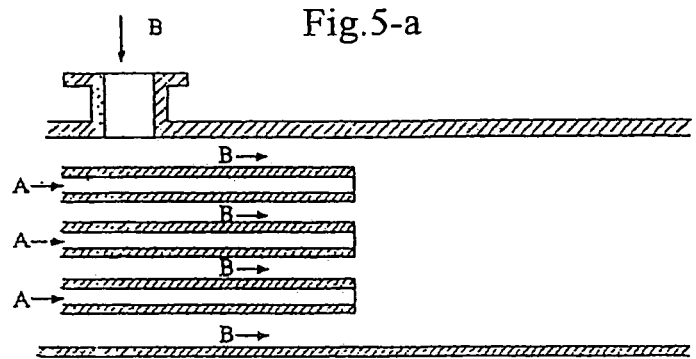
Fig.5-a
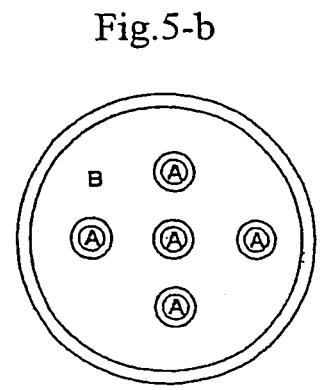
Fig.5-b
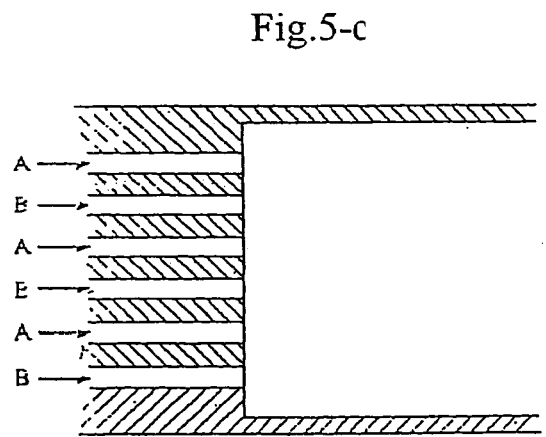
Fig.5-c
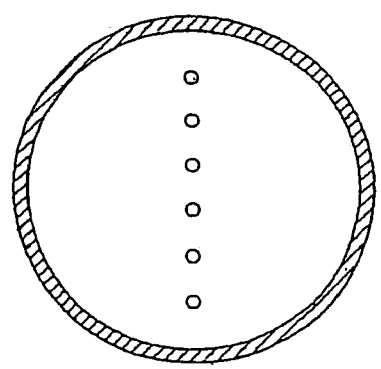
Fig.5-d
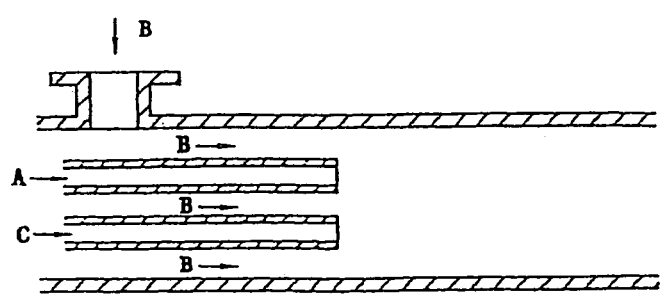
Fig.6-a
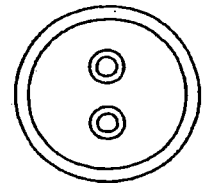
Fig.6-b

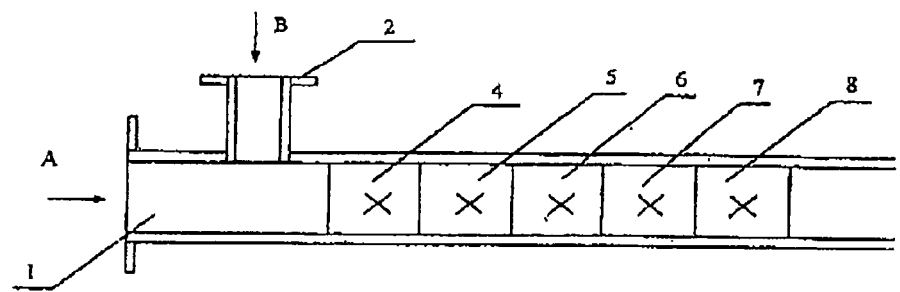
Fig.7-a
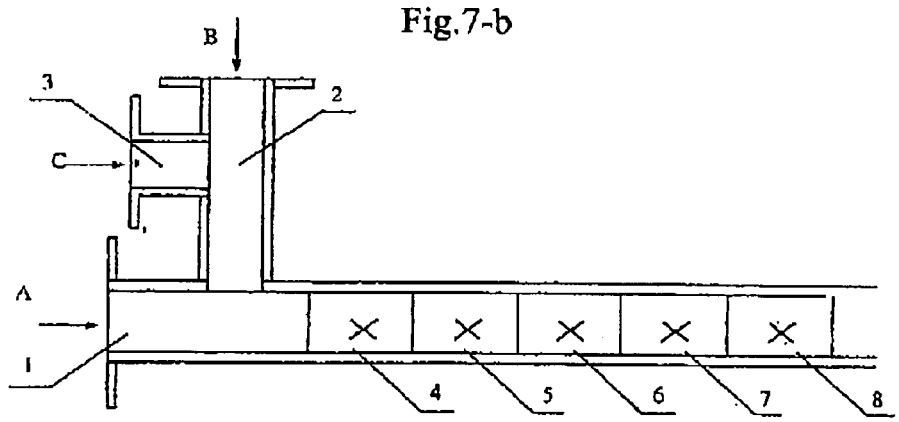
Fig.7-b
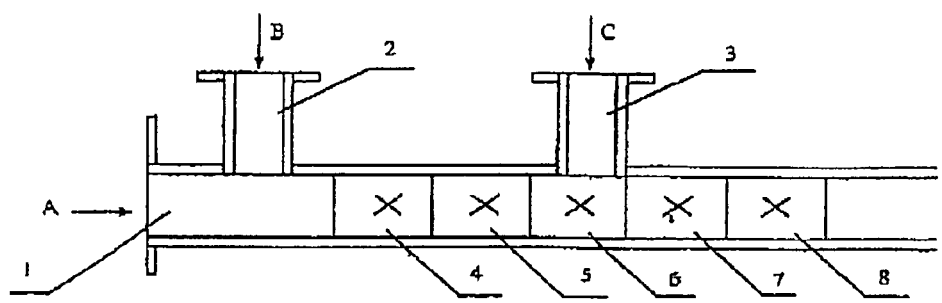
Fig.7-c

Fig.8-a 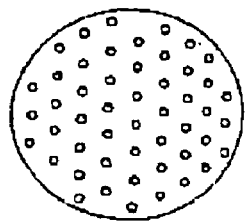
Fig.8-b 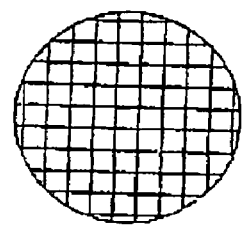
Fig.9
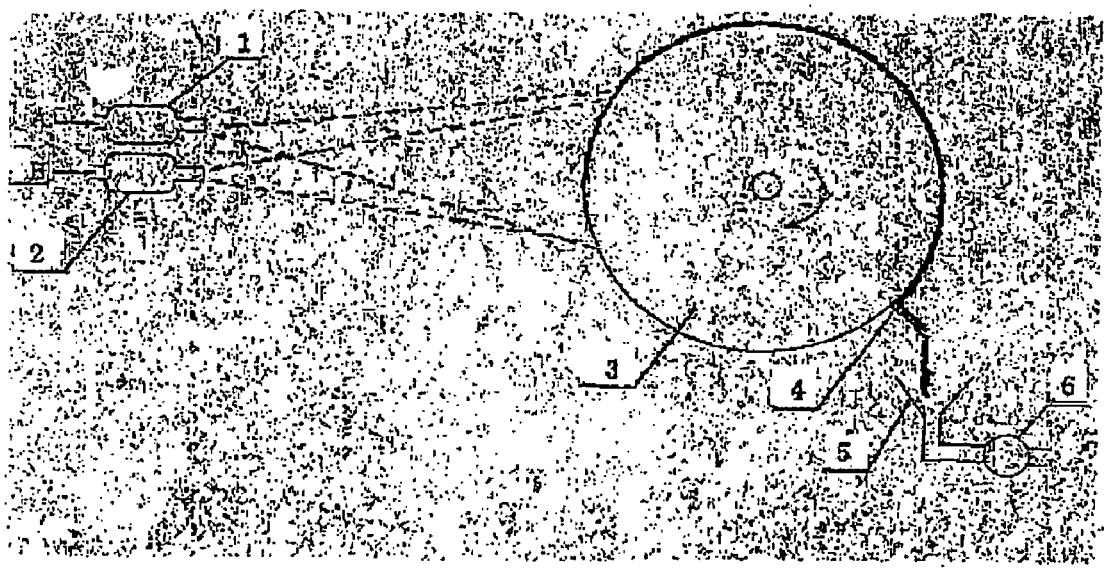

PROCESS FOR PRODUCING NANO-POWDERS AND POWDERS OF NANO-PARTICLE LOOSE AGGREGATE

RELATED APPLICATIONS

This application represents the U.S. National Phase of International Application No. PCT/CN02/00521 filed Jul. 26, 2002, designating the United States of America and published in Chinese, which claims the benefit of priority of Chinese Patent application No. 01127978.8 filed Jul. 27, 2001.

FIELD OF THE INVENTION

The present invention relates to a method of preparation for ultra fine powders. More specifically, it relates to a method of preparation for nanometer grade powders (hereinafter called as nano-powders) and powder of loose aggregates of the nanometer grade particles (hereinafter it is called as nano-particle loose aggregate powder, and the nanometer grade particle as nano-particle). Especially, it relates to a method utilizing liquid phase chemical reaction to form a precipitate to prepare nano-powders and nano-particle loose aggregate powders.

BACKGROUND OF THE INVENTION

It is well known that particulates of metals or metal oxides with sizes at nanometer level or submicron level are very useful industrial products in many fields of application. These applications include the manufacture of catalysts used in chemical industry, pottery and porcelain, electronic elements, coating, capacitor, mechanical-chemical polishing slurry, magnetic tape and fillers for plastics, paint or cosmetics.

It is possible to produce ultra fine particulates of metals or metal oxides by various technologies including high temperature gas phase method, mechanical method, chemical method and etc. Reviews on the general technology of the production of nano-particle were published in the following papers: V. Hlavacek and J. A. Puszynski, "Advances in the Chemical Industry of Advanced Ceramics", Industrial Engineering and Chemistry Research, 1996, vol. 35, 349–377; "Advances on the Method of Preparation for Nano-particles", Chemistry Bulletin (in Chinese), 1996, No. 3, 1–4. In CN 1217387A, there was also a detailed discussion on the advantages and disadvantages of the various technologies.

The process of the liquid phase precipitation method is simple. When compared with the gas phase method, solid phase method or other liquid phase method, its controlling condition is not so critical and its cost is lower. Therefore nowadays the liquid phase precipitation method is widely used.

The characteristics of the process of the conventional liquid phase precipitation method are as follows: stirring pot is used to carry out mixing reaction, and at least one of the reactant solutions is gradually added into the stirring pot by dropping, flowing in or atomizing for a relatively long time. Although this technology for preparing nano-particles has the advantage of simple operation, low cost and high yield, it has three generally recognized disadvantages as follows: (1) it is difficult to control particle diameter; (2) it is difficult to obtain very small particle diameter; (3) it is difficult to eliminate hard agglomeration among particulates. The origin of the drawbacks of the pot technology comes from the too long feeding time for one of the reactant solution and from the mixing of the reaction, product and precipitate formed at different stages of time while stirring. Nuclei formed at the initial stage will undergo growth and collision coalescence among small particulates to form nano-particles. Due to long time, nano-particles will grow to be relatively larger in size and will agglomerate together among nano-particles. The participation of the product formed in the later stages will induce agglomeration hardening. As mentioned above, these are the causes of the above-mentioned three drawbacks of the large pot technology in preparing nano-powder.

Therefore, various processes of liquid phase precipitation method for producing nano-powder without the use of stirring pot have been successively developed. Patent Application No. SE 99/01881 disclosed the following method and facilities: on the basis of a stream of carrier fluid flowing continuously in a pipe, two kinds of reactant solutions were injected in the form of periodical, intermittent pulse into the pipe at the same location. The reaction zone where the mixing of the injected two reactant solutions took place was separated in the carrier fluid. The lasting time for the course of mixing, reacting, and forming precipitate was very short. The invention claimed that the quality of the nano-particles was very good, with particulate size at 10–20 nm, slight inter-particulate agglomeration or even no agglomeration. The drawbacks of that method are: (1) reactant solutions are injected in a pulse mode and the mixing process is not continuous, thus the process is not favorable for large-scale continuous industrial production, and since carrier fluid must be used, the manufacturing process gets complex, it not only consumes carrier fluid but also needs a separation treatment for the carrier fluid and etc. and thus increases the production cost; (2) the method does not take any effective measures to reinforce and to adjust the mechanical mixing efficiencies of the two reactant solutions, therefore, it is impossible to effectively control the mechanical mixing efficiency of the reactant solutions. The above two drawbacks both shall be improved.

Other 2 papers, "Preparation of Strontium Carbonate Nano-powder by Liquid-Liquid Method in Rotating Packed Bed", Science and Technology in Chemical Industry (in Chinese), 1999, 7(4) 11–14 and "Experimental Study on Microscopic Mixing in Rotating Packed Bed", Chemical Reaction Engineering and Technology (in Chinese), 1999, 9, Vol.15, No. 3, 328–332, described another kind of continuous process without the use of stirring pot. Two reactant solutions were allowed to pass continuously through rotating packed bed at one time. In the rotating packed bed, two reactant solutions mixed, reacted, formed nuclei and formed nano-particles. The paper stated that under the action of super gravity, the reactant solutions passed through the rotating packed bed and were dispersed, broken by the packing and formed very large and continuously refreshing surface area, greatly reinforced the material transfer condition. Besides, the process of rotating packed bed has the advantage of high intensity of fluid passage and short resident time. However, there were still some drawbacks in the method of super gravity rotating packed bed. Due to the high compactness of the fillers such as steel wire net and in the packed bed, what obtained by the solution was not the action of stirring and shear. When solution entered into the packed bed, it as a whole rotated with the packed bed and obtained centrifugal force. Under the action of centrifugal force, the solution would flow from inner fringe of the rotor to outer fringe along the interstitials of the packing and in the course of this process, mixing of solution took place. The mechanical mixing intensity and the adjusting sensitivity of such kind of mixing were not high enough and thus the performance of the preparation of nano-powder was not ideal. Except nano-powder of $CaCO_3$ and $SrCO_3$, no report on the successful preparation of important species such as $Zro_2$, $TiO_2$ by using rotating packed bed was disclosed. Therefore the method seems to need further improvements.

As mentioned above, a good mixing and reacting facility for continuous passage of two reactant solutions should have the characteristics of high mechanical mixing intensity, adjustable mechanical mixing intensity and simplicity of structure. Within such facility, the solution should acquire vigorous stirring, shearing and turbulence and would quickly be separated and broken into isolated very small sized micro liquid agglomerates in order to enlarge the interface of the two solutions so as to provide good conditions for the processes of molecular diffusion, chemical reaction, nucleation and etc.

Chinese Patent Application No.01106279.7 filed on Mar. 7, 2001, which has not been disclosed and is entirely incorporated herein as a reference, provides a process without using a stirring pot comprising: continuously feeding reactant solutions into a dynamic rapidly and orderly micro liquid agglomerate mixing and reacting precipitator to separate the reactant solutions into a large amount of micro liquid agglomerates capable of rapidly mixing and reacting with each other in a turbulence state in reaction zones orderly arranged along the fluid direction to from a precipitate-containing slurry; feeding the precipitate-containing slurry from the mixing and reacting precipitator to a procedure of rinsing and filtering; and treating the resulting precipitates by various processes such as drying, heat treatment, pulverization and the like. The nano-particle is very fine and uniform. The hard agglomeration among the nano-particles is prevented.

Therefore, the objective of the present invention is to further improve the process disclosed in Chinese Patent Application No. 01106279.7 and to provide a further method of preparing nano-powder by liquid phase precipitation. The method of the present invention adopts a mixing facility which is simple in structure, can provide high and adjustable mechanical mixing intensity and can be used for large-scale production of good quality nano-powder. The method is widely applicable in the production of nano-powders of oxides, hydroxides, salts, metals and the like. Moreover, the number of devices can be decreased and the parameters to be controlled can be simplified.

After reading the following descriptions, this and further objectives, advantages and features of the present invention will become clearer.

SUMMARY OF THE INVENTION

The present invention provides a method for preparing nano-powders and nano-particle loose aggregate powder, comprising the following steps:
(a) providing at least two reactant solutions A and B which can react with each other quickly to form precipitate;
(b) feeding the at least two reactant solutions A and B to a mixing and reaction precipitator separately which is at least one selected from a group consisting of tubular ejection mixing reactor, tubular static mixing reactor and atomization mixing reactor at a temperature not lower than the reaction temperature for continuous and orderly mixing, reaction and precipitation, where the at least two reactant solutions A and B react with each other in a form of micro-liquid aggregate and form a precipitate-containing slurry; and
(c) post-treating the precipitate-containing slurry discharged continuously and orderly from the reaction precipitator.

BRIEF DESCRIPTION OF THE DRAWINGS

FIG. 1 is a schematic diagram for the spatial concentration distribution vs. time.

FIG. 3-*a* shows a coaxial ejection mixing reactor.

FIG. 4-*a* shows an ejection mixing reactor with an inlet at a side thereof.

FIG. 3-*b*, 3-*c* and FIG. 4-*b*, 4-*c* show an ejection mixing reactor for three solutions.

FIG. 5-*a*, 5-*b* show a coaxial ejection mixing reactor with a plurality of nozzles through which the solution A is ejected and an inlet through which the solution B flows.

FIG. 5-*c*, 5-*d* show a coaxial ejection mixing reactor with a plurality of nozzles through which the solution A are ejected and a plurality of nozzles through which the solution B are ejected.

FIG. 6*a–b* shows a coaxial ejection mixing reactor with a side inlet through which the solution B flows and a plurality of nozzles through which the solution A and the solution C are ejected.

FIG. 7-*a* shows a tubular static mixing reactor for solution A and solution B.

FIG. 7-*b*, 7-*c* show a tubular static mixing reactor for solution A, solution B and solution C.

FIG. 8-*a* shows a hole/separator mixing member.

FIG. 8-*b* shows a grid mixing member.

FIG. 9 shows an atomization mixing reactor.

DETAILED DESCRIPTION OF THE PREFERRED EMBODIMENT

Figure 2:
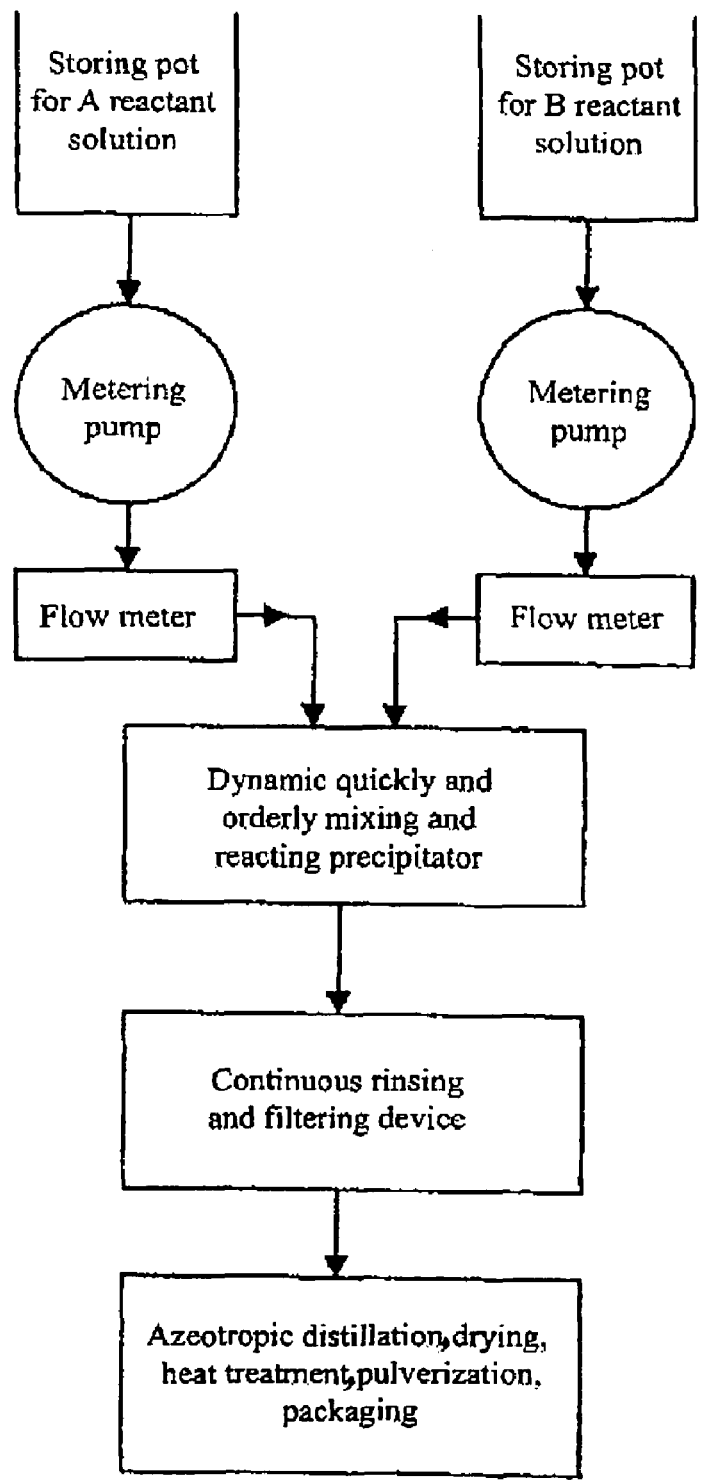
FIG. 2 is the process flow diagram for a method of the present invention.
Figure 10:
FIG. 10 shows an electronic micrograph of the powder obtained in example 1.

In the context of the present invention, the term "nano-powder" represents a powder comprised of nano-particles having an average particle diameter of less than 100 nm. The excellent nano-powder obtained by the present process shall has the following advantages: a small average particle diameter (less than 30 nm or even as low as 10 nm); a narrow particle size distribution; a good dispersibility (only soft-linkage or slight linkage and no hard-linkage).

Herein, the term "nano-particle loose aggregate powder" means an aggregate of nano-particles linked in such a way that the nano-particles are net-like linked and loosely dispersed in a space. A good nano-particle loose aggregate powder shall has the following features: (1) the nano-particles have a small average particle diameter and a narrow particle size distribution; (2) the nano-particles are loosely and net-like dispersed in a space and can have a suitable strength after a suitable aging treatment; (3) it has a high specific surface area and thus can be used as a carrier for catalysts or drugs; and (4) the desired particle diameter thereof can be predetermined according to the granulation and pulverization processes.

At least two different liquid fluids are separated and dispersed stepwise to form dispersed and separated liquid micro aggregate of small size by the impact, shearing, stretching and eddying functions of a convective movement and a turbulent movement resulting from various high intensity mechanical mixing. The average size of the liquid micro aggregate are in relation to the way and intensity of the mechanical mixing, and can be as small as 100 μm, tens of μm or even ten something of μm, see Chemical Engineering Handbook, Beijing, Chemical Industry Publishing House, Vol. 5, p9–10. Herein, the term "micro liquid aggregate" has the above meaning.

The term "tubular ejection mixing reactor" represents a tubular ejecting mixer where the reaction and precipitation will automatically take place following the mixing of the solutions. During the ejection mixing, a liquid stream moving quickly (a ejecting flow or a first liquid) is ejected into a liquid stream moving slowly (a main flow or a second liquid). On the boundary of the ejecting flow, a mixing layer is formed due to the difference between the speed of the ejecting flow and that of the main flow and due to the turbulent function. The mixing layer expands along the flow direction of the ejecting flow, and allows the main flow to enter into the ejecting flow by carrying and mixing. The tubular ejector is a continuous flow apparatus of a high speed. The coaxial ejecting mixer and the ejecting mixer with a side inlet are two common ones. As shown in FIG. 3-a, in the coaxial ejecting mixer, the second liquid streams in a large diameter pipe but is not ejected into the coaxial ejecting mixer, and the ejecting flow is ejected into the coaxial ejecting mixer through a small diameter pipe and is coaxially placed in the large diameter pipe. In the ejecting mixer with a side inlet, as shown in FIG. 4-a, the second liquid also flows in a large diameter pipe but the ejecting flow is ejected through a small diameter pipe perpendicular to the large diameter pipe into the ejecting mixer with a side inlet.

As a tubular ejecting mixer, a coaxial mixer with a plurality of nozzles can be provided. For example, FIG. 5-a shows one mixer into which the ejecting flow B is ejected through nozzles, and FIG. 5-b further shows that the reactant solutions A and B are both ejected through a plurality of nozzles into a large diameter pipe.

The term "tubular static mixing reactor" means a mixer without movement and is a on-line mixing apparatus comprised of a serial of mixing members placed in a pipe where the solutions will automatically react and precipitate after mixing. As shown in FIG. 7, various mixing members can be obtained from various manufactures and are static during the mixing procedure. The energy for mixing comes from the additional pressure decrease created by the flow of the solutions over the mixing members. Therefore, the required energy for pumping these solutions is higher than usual. The desired number of mixing members for various applications depends upon the difficulty of mixing. Therefore, the more difficult the mixing is, the more the mixing members are required.

The mixing in the static mixer includes a laminar flow mixing and a turbulent flow mixing. The laminar flow mixing is carried out by a combination of stream separating and changing of flowing direction. But the turbulent mixing is carried out by controlling the flux and creating by the mixing members more intensive turbulent function higher than that in an empty pipe. The static mixer has been widely used in processes, such as, mixing, reaction, dispersion, heat-conduction and mass transfer. The static mixer is generally operated by using a turbulent flow which can result in the breaking up of liquid aggregates due to the shear stress in the system and thus can create a bigger interface area of liquid aggregate required for the mass transfer. The stress is in relation to the pressure decrease. Therefore, the stress is also in relation to the flux of the fluid through the mixer. In order to obtain a smaller micro liquid aggregate, the flux of the fluid must be increased because singly increasing the number of the mixing members is helpless for the system. For the mixing and dispersion, the on-line static mixer has such an advantage that it can be continuously operated and requires a smaller working space. The conventional static mixer can be arranged in a pipe of a diameter from 1 cm to 0.5 m.

The term "atomization mixing reactor" represents a novel atomizing mixer capable of transforming a reactant solution into an atomized gas stream and where the reactant solutions can automatically react and precipitate after mixing. FIG. 9 shows a preferred example of the atomization mixing reactor at least comprising an atomizer 1 and an atomizer 2 adjacent to each other and capable of transforming the reactant solutions into oriented atomized gas streams flowing in the substantially same direction. The two atomizers have the same structure and characteristics and are adjusted to allow nearly all the fine droplets carried by the two atomized gas stream to fall on the same portion of one side of roller 3 (or on the same portion of the transfer belt). Two kinds of fine droplets falling on the same portion are mixed by alternatively overlaying each other, and a slurry layer is formed. The atomizing is carried out continuously. The roller rotates slowly. The thickness of the slurry layer, obtained by mixing and reacting the micro liquid aggregates of the two solutions, can be controlled by adjusting the rotate speed of the roller. The precipitate-containing slurry is transferred by the roller or the transfer belt to scraper 4 where it is scraped and collected to a funnel 5 and then transferred to rinsing and filtering devices through a pipe and pump 6. The above transfer belt includes a wet filter cloth of a belt-type filter. The aging time before filtering and rinsing is adjusted by controlling the moving speed of the filter cloth v and the length of the filter clothAl before reaching the filtering and rinsing zone. The aging time can be calculated on the basis of the formula $\Delta t = \Delta l/v$.

Although not intend to be limited by any theory, it should be pointed out that the present inventor puts forward the present technical solution on the basis of inventor's theory integrated with experimental results. It should be pointed out that the following theory is used only to explain the present invention but not to limit the present invention in any way.

It can be drawn from the experimental observation and mechanism analysis that when two reactant solutions capable of reacting rapidly to form a precipitate meet together, a large amount of nuclei will be explosively formed at the fresh interfaces of the two solutions. After the explosive nuclei formation, new nuclei will no longer be formed at that place. Let the solutions of A and B be represented by α and β, the equation of reaction will be

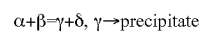
$$\alpha + \beta = \gamma + \delta, \gamma \rightarrow \text{precipitate}$$

The concentration of α, β and the precipitated component γ are C1, C2, and C, respectively. FIGS. 1(a) and (b) indicate the spatial distribution curves for C1, C2 and C at time interval of t=0 and t=t respectively. When C exceeds critical nucleation concentration Ck, nucleation can take place within the region of a and b. FIG. 1(c) indicates the curve of change of concentration against time in the course of explosive nucleation within the region a-b. The curve is just the known "lamer" profile. It is shown in FIG. 1(c) that after explosive nucleation, the precipitated components formed by reaction and diffusion can only afford the growth of the nuclei already formed. New nuclei will no longer be formed because the concentration is lower than the critical nucleation concentration. Based on the above result, the following deduction can be drawn. When reactant solutions A and B are intermingled rapidly in the form of micro liquid agglomerates, the following results can be obtained: (1) fresh interfaces of huge surface area are rapidly formed between a definite amount of reactant solutions A and B and then a large amount of pristine nuclei will be explosively formed; the smaller the size of micro liquid agglomerate is, the larger the surface area of fresh interface will be, the larger the total number of formed pristine nuclei will be, and the larger the average density (number of pristine nuclei per unit of space) will be; (2) when the size of the micro liquid agglomerate is decreased, the time of the whole process of molecular diffusion and chemical reaction will correspondingly be shortened. Rapid mixing of micro liquid agglomerates and the explosive formation of all the pristine nuclei will provide good conditions for the simultaneity of the collision coalescence of small particulate to form nano-particles, homogeneity of particulate size as well as the decrease of particulate dimension.

It was shown by examples that the particle size of the nano-particle formed by collision and aggregation will become smaller if the pristine nuclei are formed explosively and the average density thereof is very high. At this case, vast quantities of nano-particles will be formed and loosely fulfill the entire space in a very short time. Only the pristine nuclei very near the nano-particle can collide with and enter into the nano-particle in a very short time for diffusion and migration. Therefore, the total number of the pristine nuclei colliding with and entering into the nano-particle is very small and the formed final nano-particle is of a very small particle size.

Therefore the present invention provides a method of preparing a nano-powder and a nano-particle loose aggregate powder comprising the following steps:

(a) providing at least two reactant solutions A and B capable of rapidly reacting with each other to form a precipitate;

(b) at a temperature not lower than the reaction temperature, continuously and respectively feeding the at least two reactant solutions A and B into a mixing and reacting precipitator selected from a group consisting of a tubular ejection mixing reactor, a tubular static mixing reactor and an atomization mixing reactor where mixing, reaction and precipitation can be continuously and orderly carried out to form a precipitate-containing slurry; and (c) post-treating the precipitate-containing slurry discharged continuously from the mixing and reacting precipitator.

As one preferred embodiment of the present invention, the method for preparing a nano-powder and a nano-particle loose aggregate powder comprises the following steps:

(a) providing reactant solutions A and B capable of rapidly reacting to form a precipitate and optionally containing an auxiliary reacting agent and a dispersing agent, and optionally providing one or more auxiliary reacting solutions containing at least one selected from a group consisting of a dispersing agent, an auxiliary reacting agent and a pH value adjusting agent;

(b) at a temperature not lower than the reaction temperature, continuously feeding the solutions into a tubular ejection mixing reactor or a tubular static mixing reactor where the solutions are continuously passed, orderly and quickly mixing and reacting with each other to form within 0.1–120 seconds a precipitate-containing slurry which will be continuously discharged from the tubular ejection mixing reactor or the tubular static mixing reactor; and (c) post-treating the precipitate-containing slurry continuously discharged from the tubular ejection mixing reactor or the tubular static mixing reactor.

As another preferred embodiment of the present invention, the method of preparing a nano-powder and a nano-particle loose aggregate powder comprises the following steps:

(a) providing reactant solutions A and B capable of rapidly reacting to form a precipitate and optionally containing an auxiliary reacting agent and a dispersing agent, and optionally providing one or more auxiliary reacting solutions containing at least one selected from a group consisting of a dispersing agent, an auxiliary reacting agent and a pH value adjusting agent;

(b) at a temperature not lower than the reaction temperature, continuously feeding the solutions into an atomization mixing reactor where the solutions are atomized into atomized droplets and sprayed by an atomizer onto a transfer belt or the wall of a roller on which the atomized droplets are orderly, quickly and alternatively mixing and reacting with each other to form within 0.1–120 seconds a precipitate-containing slurry which will be continuously discharged from the atomization mixing reactor; and (c) post-treating the precipitate-containing slurry continuously discharged from the atomization mixing reactor.

As one specific embodiment of the present method shown by FIG. 2, reactant solutions A and B are respectively stored in a storing tank and fed through a metering pump or a flow meter into a mixing and reacting precipitator where they can continuously, orderly and quickly mixing and reacting with each other to form a precipitate-containing slurry. The precipitate-containing slurry discharged from the mixing and reacting precipitator enters into an aging (if any), rinsing and filtering procedure, and then is dried, heat-treated, pulverized or granulated and finally packaged.

The form of reactant solutions A and B has no specific limitations. They can each independently be aqueous solution (including pure water) or organic solvent solution (including liquid state pure material). The auxiliary reacting solution can be either aqueous solution or organic solvent solution. Reactant solutions A and B can also contain an auxiliary reacting agent and a dispersing agent. The mixing volume ratio for reactant solutions A and B can be arbitrary, but preferably 1:1. The mixing volume ratio for other adjuvant reactant solutions can be arbitrary. The temperature of the reactant solution entering the mixing and reacting precipitator can be any temperature sufficient for carrying out the mixing and reaction. For the reactant aqueous solutions, the preferred temperature range is between 15° C. and the boiling point of the solutions, for example, 15–98° C. For the reactant organic solvent solutions, the preferred temperature range is also from 15° C. to the boiling point of these solutions.

There is no limitation on the dispersing agent, auxiliary reacting agent and pH adjuster used in step (a). They can be those of the conventional type. The dispersing agent for the reactant aqueous solution includes a lower alcohol and a surfactant. The sulfuric acid $H_2SO_4$ added into $Ti(SO_4)_2$ solution to inhibit hydrolysis can be taken as an example of the auxiliary reacting agent.

In step (b), the reactant solutions A and B are dispersed and broken into many separated micro liquid agglomerates, and fresh interfaces of huge surface area are produced between the two solutions. In the vicinity of these interfaces, a huge number of pristine nuclei will explosively be formed along with the occurrence of molecular diffusion and chemical reaction. Reactant solutions A and B are intermingled in the form of micro liquid agglomerates, which will result in the great shortening of the time necessary for the process of the molecular diffusion and chemical reaction.

According to one preferred embodiment, when the residence time of the solutions through the "mixing and reacting precipitator" is longer than the time of diffusion and reaction, the particle diameter of the nano-particle can be decreased, and the hard agglomeration among the nano-particles can be lessened or even eliminated by shortening said residence time to 0.2–10 seconds.

In the step (c) of the present invention, the precipitate-containing slurry continuously discharged from the mixing and reacting precipitator enters into a rinsing and filtering procedure to prepare a nano-powder or into an aging, rinsing and filtering procedure to prepare a nano-particle loose aggregate powder. The aging time is 0–120 min. If no aging is required or the aging time is shorter than 20 minutes, the devices capable of being continuously operated are preferred. The type of washing can include ionic electric field dialysis, water or organic solvent washing and etc.

The post-treatment can further include drying, heat treatment, pulverizing or granulating, and final packaging. The examples of drying processes include conventional drying, spray drying, vacuum drying, freeze drying, supercritical drying and azeotropic distillation. The preferred temperature for heat treatment is in the range of 200–1000° C.

The amount and running order of the above-mentioned post-treatment steps can be adjusted according to the types of the product and detailed request of the customer.

The mixing and reacting precipitator used in step (b) of the present invention will be specifically described in reference to the attached figures.

The examples of the tubular ejection mixing reactor include a coaxial ejection mixing reactor, an ejection mixing reactor with side inlets and an ejection mixing reactor with a plurality of nozzles.

FIG. 3-a shows a coaxial ejection mixing reactor used for reactant solutions A and B, which includes an ejecting inlet 1 for one solution (called as the ejected solution), an inlet 2 for another solution (called as the second solution), and a mixing and reacting zone 3 comprised of pipe(s) having a bigger diameter. The second solution enters into the reactor from the inlet 2, flows as a turbulent flow in the large diameter pipe at a slower speed. The ejected solution is ejected at a high speed through the inlet 1 of a small diameter pipe coaxial to the large diameter pipe. During the ejecting process, a mixing layer is formed due to the function of turbulent flow and the speed difference between the ejected solution and the second solution. As a result, the second solution enters into the ejected solution, and two solutions are broken and dispersed into separated micro liquid aggregates due to impacting, shearing, stretching and eddying. The average size of the micro liquid aggregate is in relation to the mixing intensity and reynolds number Re, specifically, to the pipe diameter and flow speed. The flow speed is in relation to the flux and the pressure. The average size of the micro liquid aggregate can be as small as tens of microns or even just 10–20 microns. As previously stated, a large amount of pristine nuclei will be explosively formed in the vicinity of fresh interfaces of the two solutions. The density (number of pristine nuclei per unit of volume of the reactor) is relatively high. As shown by some experiments, the particle size of the nano-particle produced by collision and aggregation between the pristine nuclei will become smaller and even as small as several nanometers. The nano-particles are loosely distributed in the space.

FIG. 4-b shows an ejection mixing reactor with side inlets for reactant solutions A and B. One solution (called as the second solution) enters through inlet 2 into and slowly flows as a turbulent flow in a large diameter pipe. Another solution (called as the ejected solution) is ejected into the ejection mixing reactor through an inlet 1 at the end of a small diameter pipe perpendicular to the large diameter pipe. The ejected solution and the second solution mix and react with each other in a mixing and reacting zone 3 to form a precipitate. The principle and the control of this reactor is substantially identical to those of the coaxial ejection mixing reactor.

FIG. 3-b, FIG. 3-c, FIG. 4-b, and FIG. 4-c show an ejection mixing reactor for three solutions A, B and C. Besides the members shown in FIG.-a and FIG. 4-a, this reactor further comprises an inlet 4 for an adjuvant reactant solution C. Preferably, the adjuvant reactant solution C is ejected into the reactor through inlet 4 so as to homogeneously mix with other solutions.

FIG. 5-a, 5-b show a coaxial ejection mixing reactor with a plurality of nozzles as small diameter pipes for solution A and a side inlet for solution B. The reactor further has a large diameter pipe. The large diameter pipe and the small diameter pipes are arranged at the same direction. Solution A is ejected into the reactor through the plurality of nozzles and solution B flows into the large diameter pipe through a side inlet.

FIG. 5-c, 5-d show a coaxial ejection mixing reactor with a plurality of nozzles for solution A and a plurality of nozzles for solution B. Preferably, the nozzles for solution A and that for solution B are parallel and are arranged with the same intervals, and a mixing and reacting zone is arranged right ahead of the nozzles.

FIG. 6 shows a coaxial ejection mixing reactor with a side inlet for solution B and a plurality of nozzles for solutions A and C.

The solutions in the tubular ejection mixing reactor are quickly mixed in a state of micro liquid aggregates by the turbulent function. The mixing and reacting zones are arranged orderly along the flowing direction of the liquid stream. The tubular ejection mixing reactor shall be operated under a turbulent state in order to high extensively and mechanically mix the two solutions. Therefore, the reynolds number shall be regulated on the basis of the equation of $Re=\rho VD/\mu$, wherein, D is the diameter of the pipe, V is the flow speed of the liquid stream, p is the density of the liquid stream and $\rho$ is the viscosity of the liquid stream. The relationship of the diameter of the pipe, the flow speed and the flux is shown in the equation of $Q=\pi D^2 V/4$, wherein, Q is the flux of the liquid stream. As can be seen, once the diameter of the pipe is determined, the flow speed can be determined by the flux of the liquid stream. It shall be further noted that, although the flux of the ejected flow is determined by the diameter and the length of the ejecting pipe and by the diameter of the large diameter pipe, a pressure is required to maintain the flux of the ejected flow. Therefore, the related parameters can be concluded as the diameter of a pipe, the flux, the pressure and the reynolds number. The related parameters of the second solution and the mixing liquid stream shall also be considered. The inner diameter of the tubular ejection mixing reactor is in the range of 0.5 mm–10 mm. The flux of the ejected flow is in the range of 0.1–3000 $m^3/h$, preferably 0.1–800 $m^3/h$. The pressure of the ejected flow is in the range of 30–3000 $kg/cm^2$, preferably 50–1000 $kg/cm^2$. The reynolds number Re of the ejected flow is in the range of 2000–20000, preferably 2000–8000. The large diameter pipe of the ejection mixing reactor has a diameter of 5–1000 mm, preferably 5–500 mm. The reynolds numbers of the second solution and the mixed flow are in the range of 3000–10000, preferably 4000–8000.

FIG. 7-a shows a tubular static mixing reactor for two reactant solutions. The reactor comprises (but not limited to) an inlet 1 for one solution, an inlet 2 for another solution, and mixing units 5–9. The number of the mixing unit is determined based on the specific requirements. The mixing units of the tubular static mixing reactor contain some mixing members, for example, Ross mixing member, Sulzer mixing member, Kenics mixing member, Etoflo mixing member, see Industry Mixing Process (translated in Chinese), N. Harnby, M. F. Edwards, A. W. Nierow. Beijing, China Petrochemical Publishing House, 1985, Edition 1, p. 279–282. This book is entirely incorporated herein as a reference. The mixing unit further contains a hole/separator mixing member, see FIG. 8-a, or a grid mixing member, see FIG. 8-b.

Taking Ross mixing member as an example, the mixing, reaction, formation of the nano-particle and precipitation processes in the tubular static mixng reactor will be illustrated. The structure of Ross mixing member can also be found in Industry Mixing Process (translated in Chinese), N. Harnby, M. F. Edwards, A. W. Nierow., Beijing, China Petrochemical Publishing House, 1985, Edition 1, p279–282. An ellipsical plate was cut into two separated parts along its long axis. The two separated parts are rotated around the short axis for 900 and used as a pair of front separators of the mixing members. The separators are welded on a support with an angle of 450 between the axis of the large diameter pipe and the plate surface. The mixing member further contains a pair of back separators along the axis of the pipe of the mixing reactor. Except that the back separators are rotated around the axis of the pipe of the mixing reactor for 900, the back separators have the same structure as that of the front separators. The tubular static mixing reactor can have a series of mixing units comprised of the front separators and the back separators. During the mixing of two solutions, the mixing units are static and the energy for mixing comes from the additional pressure drop created by the passage of the solutions through the mixing units. The laminar convection and the turbulent flow both facilitate the mixing procedure. The fluid will be separated by the separators into a plurality of smaller flows and the flow direction will be changed by the separators, as a result, the laminar convection is formed. The turbulent flow is obtained by controlling the reynolds number. As a result, two solutions are broken and dispersed into separated micro liquid aggregates due to impacting, shearing, stretching and eddying caused by extensively convection and turbulence. The average size of the micro liquid aggregate is in relation to the mixing intensity and reynolds number Re, specifically, to the pipe diameter and the flow speed. The flow speed is in relation to the flux and the pressure. The average size of the micro liquid aggregate can be as small as tens of microns. As previously stated, a large amount of pristine nuclei will be explosively formed in the vicinity of fresh interfaces of the two solutions. The density (number of pristine nuclei per unit of volume of the reactor) is relatively high. As shown by experiments, at this case, the particle size of the nano-particle produced by collision and aggregation between the pristine nuclei will become smaller and the nano-particles are loosely dispersed in the space of the reactor. The inner diameter of the tubular static mixing reactor is in the range of 5 mm to 1000 mm, preferably 5 mm to 500 mm. The flux of various reactant solutions is a range of 0.1–3000 m$^3$/h. The inlet pressure of the solution is 0.5–3000 kg/cm$^2$, preferably 2–1000 kg/cm$^2$. The reynolds number of the solutions and the mixed flow is in the range of 3000–20000, preferably 3000–8000.

FIGS. 7-b and 7-c show a tubular static mixing reactor for three or more solutions. Besides the members shown in FIG. 7-a, it further comprises an inlet 4 for an adjuvant reactant solution C.

As to the atomization mixing reactor used in the step (b) of the present invention, reactant solutions A and B can be sprayed out using a first and a second atomizer. If required, the atomization mixing reactor can further contain a third atomizer for adjuvant reactant solution.

FIG. 9 shows an atomization mixing reactor having two atomizers which are especially suitable for the present method. It comprises two atomizers 1 and 2 capable of forming oriented gas stream, a roller 3, a scraper 4, a funnel 5 and a transfer pump 6. It is operated as follows: (a) reactant solutions A and B are fed into two atomizers 1 and 2 at the inlet of the mixing reactor with two atomizers; (b) the atomized gas streams from the reactant solutions A and B are atomizing in the same direction onto the roller 3 or a transfer belt where the atomized droplets of the reactant solutions A and B mixes and reacts with each other to form a precipitate-containing slurry; (c) the precipitate-containing slurry is transferred by the roller or the transfer belt to the scraper 4 where it was bladed off, collected to the funnel 5, and sent to a rinsing and filtering device through a pipe and a pump 6; and (d) the transfer belt comprises a wet filter cloth used for a belt-type filter, and the aging time prior to filtering and rinsing is regulated by the filter cloth moving speed v and the length Δl of the filter cloth prior to reaching the filtering and rinsing zone. The aging time can be calculated according to the equation $\Delta t = \Delta l / v$. The fluxes of reactant solutions A and B are in the range of 0.1–3000 m$^3$/h, and the pressures are in the range of 10–3000 kg/cm$^2$.

During the solutions continuously and orderly mixed and reacted with each other to form a precipitate, from the point of how the solutions are separated and dispersed into micro liquid aggregates, the method using an atomization mixing reactor and the method using a tubular ejecting (or static) mixing reactor are different.

In the method using a tubular ejecting (or static) mixing reactor, two solutions are separated and dispersed into separated micro liquid aggregates due to impacting, shearing, stretching and eddying caused by extensively convection and turbulence. The average size of the micro liquid aggregate is in relation to the mixing intensity and reynolds number Re. However, in the method using an atomization mixing reactor, the two solutions are atomized as two sorts of fine droplets using atomizers in air, and the resulting two sorts of fine droplets are alternatively falling on the same position of the roller or the transfer belt. As a result, the two sorts of micro liquid aggregates are mixed with each other. But from the point of the procedure and the rules of the explosive formation of pristine nuclei on the interfaces of the micro liquid aggregates by making two solutions mix and react with each other, the atomizing mixing and the tubular ejecting (or static) mixing are the same. That is, the smaller the micro liquid aggregates are, the higher the fresh interface area is, and the higher the total number of the pristine nuclei and the average density (number per unit of the space) are. And if a large amount of pristine nuclei are explosively formed and the average density (number per unit of volume of the space) is very high, the particle size of the nano-particle obtained by collision and aggregation of the pristine nuclei will become smaller.

Various atomizers can be used in the present method, but among them, the following two are preferred.

a. Pressure Nozzle

A certain pressure (typically 2–20 MPa, or higher) is provided by a high pressure pump to the solutions. When passing the nozzle, the static pressure energy is transferred into dynamic energy and the solutions are ejected at a high speed and separated into atomized droplets. The size of the atomized droplets obviously depends upon the pressure of the liquid stream. This atomizing method is simple, inexpensive and low at energy consumption.

b. Gas Stream Nozzle

The solutions are ejected from the nozzles by a pressure gas at a high speed (300 m/s or sonic speed) and are separated into atomized droplets due to the friction caused by the speed difference between the gas phase and the liquid phase. When the gas is atomized, the pressure of the liquid phase mainly influences the flux but has little influence on the size of atomized droplets. The pressure of the liquid phase is generally not higher than 0.4 MPa, and that of the gas phase is generally in the range of 0.3–0.7 MPa. The contacting points of the liquid phase and the gas phase can be in the inner or outer of the nozzles. The atomizing effect is good, the liquid droplets are fine and can be as small as 50 microns. The size of the liquid droplets depends upon the gas speed and is in relation to the gas pressure. The energy consumption of this atomizing method is about several times of that of the pressure atomizing method.

In summary, by the above atomizers, the solutions can be easily separated and dispersed into micro liquid aggregates having an average size as small as 100 microns or even tens of microns. That is, from the point of average size, the property of the atomization mixing reactor is not inferior to that of the tubular ejecting (or static) mixing reactor. Besides the fluxes of the solutions, the main parameter to be controlled is the size of atomized droplets. The fluxes of the solutions are in the range of 0.1–3000 $m^3/h$, preferably 0.1–800 $m^3/h$. The size of atomized droplets is 20–300 microns. In the method using pressure nozzles, the pressure used for the feeding solutions is 20–500 $kg/cm^2$, preferably 20–300 $kg/cm^2$. In the method using gas stream nozzles, the pressure used for the feeding solutions is 3–50 $kg/cm^2$, preferably 3–20 $kg/cm^2$.

The method of the present invention can be applied to various reactions capable of reacting rapidly and forming precipitates. Therefore there is no specific limitation on the kinds of precipitates and formed nano-powders provided by the present invention. For instance, metals (including alloys), oxides, hydroxides, salts, phosphides and sulfides or organic compounds are all in the scope of the present invention.

As compared with the existing technology, the method of the present invention has the following advantages:

(1) particulate diameter of the nano-particles is adjustable, the homogeneity of the particle size is very good, the dispersity of the nano-particle is good, the hard agglomeration of the nano-particles can be completely prevented, and thus the quality of the nano-powder is excellent;

(2) it can be used to produce a nano-particle loose aggregate powder comprised of smaller and homogeneous nano-particles and having a homogeneously distributed and regulable loose degree and porosity and a higher specific surface area;

(3) this method can give a high yield and can be used in a large-scale production;

(4) as compared with the micro liquid aggregates mixing and reacting precipitator used in Chinese Patent Application No. 01106279.7, the mixing and reacting precipitator where the micro liquid aggregates can quickly and orderly mix and react with each other has no dynamic rotator, and the controlling of the parameters can be greatly simplified; and (5) the process is simple and low in energy consumption.

Detailed illustrations of examples of the present invention are further given by combining the attached figures. However, these examples do not mean any limitation in any form on the scope of the present invention.

EXAMPLE 1

773.4 g of zirconium oxide chloride $ZrOCl_2.8H_2O$ (molecular weight=322.25 and purity≧99%) was weighed and 3000 ml of 0.8 mol/L $ZrOCl_2$ aqueous solution was prepared from the zirconium oxide chloride, called solution A. Secondly-distilled water and then 2100 ml of ethanol (95%) as a dispersing agent were added to 375 ml of ammonia having a $NH_3$ concentration of 25% to produce 3000 ml of an aqueous solution called solution B. Solution A and solution B were mixed in a tubular coaxial ejection mixing reactor as shown in FIG. 3-a and reacted with each other to form precipitate at room temperature of 20° C. as illustrated in the process flow chart shown in FIG. 2. The pH value of the resultant was adjusted to be 7–8 by the addition of ammonia. The tubular coaxial ejection mixing reactor had an inner diameter of 10 mm and an inner diameter of spray hole of 1 mm. The flows of solution A and solution B are both 200 L/h. The pressure at the spray inlet for solution A was 100 $kg/cm^2$. The slurry containing the resulting precipitate was fed into a continuously-running equipment for rinsing and filtration, then subject to azeotropic distillation in the presence of n-butanol and dried, and sintered at the temperature of 650° C. for 50 min to obtain $Zro_2$ nano-powders having an average particle diameter of 15 nm and having good uniformity in particle diameter and good particle dispersibility. The yield of $Zro_2$ was 92%.

EXAMPLE 2

333.6 g of $ZnCl_2$ was weighed and secondly-distilled water was added to produce 3000 ml of 0.8 mol/L $ZnCl_2$ aqueous solution called solution A at a temperature of 70° C. 900 ml ethanol (95%) as a dispersing agent was added to 375 ml of ammonia water (25%) to produce 3000 ml of 0.8 mol/L $NH_3$ aqueous solution in ethanol called solution B at a temperature of 30° C. Solution A and solution B were mixed in a tubular coaxial ejection mixing reactor as shown in FIG. 3-a and reacted with each other to form precipitate as illustrated in the process flow chart shown in FIG. 2. The pH value of the resultant was adjusted to be 7–8 by the addition of ammonia. The tubular coaxial ejection mixing reactor had an inner diameter of 10 mm and an inner diameter of spray hole of 1 mm. The flows of solution A and solution B are both 150 L/h. The pressure at the spray inlet for solution A was 90 $kg/cm^2$. The slurry containing the resulting precipitate was fed into a continuously-running equipment for rinsing and filtration, then subject to azeotropic distillation in the presence of n-butanol and dried, and sintered at the temperature of 550° C. for 30 min to obtain ZnO nano-powders having an average particle diameter of 40 nm and having good uniformity in particle diameter and good particle dispersibility. The yield of ZnO was 92%.

EXAMPLE 3

441.6 g of $BaCl_2$ was weighed and secondly-distillated water and 900 ml ethanol were added to produce 3000 ml of 0.6 mol/L $BaCl_2$ aqueous solution called solution A at a temperature of 20° C. 156.6 g of $NH_4HCO_3$ was weighed and secondly-distillated water, 180 ml of ammonia water (25%) and 1200 ml of ethanol (95%) as a dispersing agent were added to produce a 3000 ml solution called solution B at a temperature of 20° C. Solution A and solution B were mixed in a tubular coaxial ejection mixing reactor as shown in FIG. 3-a and reacted with each other to form precipitate as illustrated in the process flow chart shown in FIG. 2. The pH value of the resultant was adjusted to be 7–8 by the addition of ammonia water. The tubular coaxial ejection mixing reactor had an inner diameter of 10 mm and an inner diameter of spray hole of 1 mm. The flows of solution A and solution B are both 160 L/h. The pressure at the spray inlet for solution A was 100 $kg/cm^2$. The slurry containing the resulting precipitate was fed into a continuously-running equipment for rinsing and filtration, then subject to azeotropic distillation in the presence of n-butanol and dried, and sintered at the temperature of 550° C. for 45 min to obtain columnar crystalline $BaCO_3$ nano-powders having a diameter of 30 nm and length of 90 nm and having good uniformity in particle diameter and good particle dispersibility. The yield of $BaCO_3$ was 93%.

EXAMPLE 4

1289 g of zirconium oxide chloride $ZrOCl_2.8H_2O$ (molecular weight=322.25 and purity≧99%) was weighed and 5000 ml of 0.8 mol/L $ZrOCl_2$ aqueous solution was prepared from the zirconium oxide chloride, called solution A. Secondly-distillated water and then 1750 ml of ethanol (95%) as a dispersing agent were added to 625 ml of ammonia water having a $NH_3$ concentration of 25% to produce 5000 ml of an aqueous solution called solution B. Solution A and solution B were mixed in a tubular static mixing reactor as shown in FIG. 7-a and reacted with each other to form precipitate at room temperature of 20° C. as illustrated in the process flow chart shown in FIG. 2. The pH value of the resultant was adjusted to be 7–8 by the addition of ammonia. The tubular static mixing reactor had an inner diameter of 10 mm and was provided inside with a Ross mixing member. The flows of solution A and solution B are both 600 L/h. The pressure at the spray inlet for solution A was 4 $kg/cm^2$. The slurry containing the resulting precipitate was fed into a continuously-running equipment for rinsing and filtration, then subject to azeotropic distillation in the presence of n-butanol and dried, and sintered at the temperature of 620° C. for 45 min to obtain $ZrO_2$ nano-powders having an average particle diameter of 16 nm and having good uniformity in particle diameter and good particle dispersibility. The yield of $Zro_2$ was 91%.

EXAMPLE 5

556 g of $ZnCl_2$ was weighed and secondly-distillated water was added to produce 5000 ml of 0.8 mol/L $ZnCl_2$ aqueous solution called solution A at a temperature of 70° C. 1500 ml ethanol (95%) as a dispersing agent was added to 625 ml of ammonia water (25%) to produce 5000 ml of 0.8 mol/L $NH_3$ aqueous solution in ethanol called solution B at a temperature of 30° C. Solution A and solution B were mixed in a tubular coaxial ejection mixing reactor as shown in FIG. 7-a and reacted with each other to form precipitate as illustrated in the process flow chart shown in FIG. 2. The pH value of the resultant was adjusted to be 7–8 by the addition of ammonia. The tubular static mixing reactor had an inner diameter of 10 mm and was provided inside with a Ross mixing member. The flows of solution A and solution B are both 500 L/h. The pressures at the spray inlets for solutions were both 3.5 $kg/cm^2$. The slurry containing the resulting precipitate was fed into a continuously-running equipment for rinsing and filtration, then subject to azeotropic distillation in the presence of n-butanol and dried, and sintered at the temperature of 530° C. for 35 min to obtain ZnO nano-powders having an average particle diameter of 35 nm and having good uniformity in particle diameter and good particle dispersibility. The yield of ZnO was 93%.

EXAMPLE 6

736 g of $BaCl_2$ was weighed and secondly-distillated water and 1500 ml ethanol were added to produce 5000 ml of 0.6 mol/L $BaCl_2$ aqueous solution called solution A at a temperature of 20° C. 261 g of $NH_4HCO_3$ was weighed and secondly-distillated water, 300 ml of ammonia water (25%) and 2000 ml of ethanol (95%) as a dispersing agent were added to produce a 5000 ml solution called solution B at a temperature of 20° C. Solution A and solution B were mixed in a tubular static mixing reactor as shown in FIG. 7-a and reacted with each other to form precipitate as illustrated in the process flow chart shown in FIG. 2. The pH value of the resultant was adjusted to be 7–8 by the addition of ammonia water. The tubular static mixing reactor had an inner diameter of 10 mm and was provided inside with a Ross mixing member. The flows of solution A and solution B are both 550 L/h. The pressures at the spray inlets for solutions were both 3.8 $kg/cm^2$. The slurry containing the resulting precipitate was fed into a continuously-running equipment for rinsing and filtration, then subject to azeotropic distillation in the presence of n-butanol and dried, and sintered at the temperature of 530° C. for 35 min to obtain columnar crystalline $BaCO_3$ nano-powders having a diameter of 35 nm and length of 80 nm and having good uniformity in particle diameter and good particle dispersibility. The yield of $BaCO_3$ was 86%.

EXAMPLE 7

515.6 g of zirconium oxide chloride $ZrOCl_{20.8}H_2O$ (molecular weight=322.25 and purity ≧99%) was weighed and 2000 ml of 0.8 mol/L $ZrOCl_2$ aqueous solution was prepared from the zirconium oxide chloride, called solution A. Secondly-distillated water and then 700 ml of ethanol (95%) as a dispersing agent were added to 250 ml of ammonia having a $NH_3$ concentration of 25% to produce 2000 ml of an aqueous solution called solution B. Solution A and solution B were mixed in a atomization mixing reactor with two atomizers as shown in FIG. 9 and reacted with each other to form precipitate at room temperature of 20° C. as illustrated in the process flow chart shown in FIG. 2. The pH value of the resultant was adjusted to be 7–8 by the addition of ammonia. The atomization mixing reactor with two atomizers was provided with a pressure nozzle with a spray pressure of 160 $kg/cm^2$. The flows of solution A and solution B are both 200 L/h. The two reactant solutions were formed into atomized gas streams in the same one direction and sprayed to the wall of the roll, where the two reactant solutions were mixed and reacted to form precipitate. The precipitate-containing slurry was collected and fed into a continuously-running equipment for rinsing and filtration, then subject to azeotropic distillation in the presence of n-butanol and dried, and sintered at the temperature of 650° C. for 30 min to obtain $ZrO_2$ nano-powders having an average particle diameter of 18 nm and having good uniformity in particle diameter and good particle dispersibility. The yield of $ZrO_2$ was 94%.

EXAMPLE 8

222.5 g of $ZnCl_2$ was weighed and secondly-distillated water was added to produce 2000 ml of 0.8 mol/L $ZnCl_2$ aqueous solution called solution A at a temperature of 70° C. 600 ml ethanol (95%) as a dispersing agent was added to 250 ml of ammonia water (25%) to produce 2000 ml of 0.8 mol/L $NH_3$ aqueous solution in ethanol called solution B at a temperature of 30° C. Solution A and solution B were mixed in a atomization mixing reactor with two atomizers as shown in FIG. 9 and reacted with each other to form precipitate at room temperature of 20° C. as illustrated in the process flow chart shown in FIG. 2. The pH value of the resultant was adjusted to be 7–8 by the addition of ammonia. The atomization mixing reactor with two atomizers was provided with a pressure nozzle with a spray pressure of 160 kg/cm². The flows of solution A and solution B are both 200 L/h. The two reactant solutions were formed into atomized gas streams in the same one direction and sprayed to the wall of the roll, where the two reactant solutions were mixed and reacted to form precipitate. The precipitate-containing slurry was collected and fed into a continuously-running equipment for rinsing and filtration, then subject to azeotropic distillation in the presence of n-butanol and dried, and sintered at the temperature of 520° C. for 35 min to obtain ZnO nano-powders having an average particle diameter of 36 nm and having good uniformity in particle diameter and good particle dispersibility. The yield of ZnO was 95%.

EXAMPLE 9

294.4 g of $BaCl_2$ was weighed and secondly-distillated water and 600 ml ethanol were added to produce 2000 ml of 0.6 mol/L $BaCl_2$ aqueous solution called solution A at a temperature of 20° C. 104.4 g of $NH_4HCO_3$ was weighed and secondly-distillated water, 120 ml of ammonia water (25%) and 800 ml of ethanol (95%) as a dispersing agent were added to produce a 2000 ml solution called solution B at a temperature of 20° C. Solution A and solution B were mixed in a atomization mixing reactor with two atomizers as shown in FIG. 9 and reacted with each other to form precipitate as illustrated in the process flow chart shown in FIG. 2. The pH value of the resultant was adjusted to be 7–8 by the addition of ammonia. The atomization mixing reactor with two atomizers was provided with a pressure nozzle with a spray pressure of 200 kg/cm². The flows of solution A and solution B are both 200 L/h. The pressures at the spray inlets for solutions were both 3.8 kg/cm². The slurry containing the resulting precipitate was fed into a continuously-running equipment for rinsing and filtration, then subject to azeotropic distillation in the presence of n-butanol and dried, and sintered at the temperature of 530° C. for 40 min to obtain columnar crystalline $BaCO_3$ nano-powders having a diameter of 32 nm and length of 89 nm and having good uniformity in particle diameter and good particle dispersibility. The yield of $BaCO_3$ was 86%.

What is claimed is:

1. A process for preparing nano-powders and nano-particle loose aggregate powders, comprising the steps of:
   (a) providing at least two reactant solutions A and B which can react with each other quickly to form precipitate;
   (b) feeding the at least two reactant solutions A and B to a mixing and reaction precipitator separately which is at least one selected from a group consisting of tubular ejection mixing reactor, tubular static mixing reactor and atomization mixing reactor at a temperature not lower than the reaction temperature for continuous and orderly mixing, reaction and precipitation, where the at least two reactant solutions A and B react with each other in a form of micro-liquid aggregate and form a precipitate-containing slurry;
   (c) post-treating the precipitate-containing slurry discharged continuously and orderly from the reaction precipitator, wherein in step (b), said tubular ejection mixing reactor comprises an inlet for ejecting the reactant solution A, an inlet for the reactant solution B and a mixing and reaction zone, where said reactant solutions A and B are rapidly dispersed and pulverized to micro-liquid aggregates in finely divided form with intense turbulent flow and then react with each other to form precipitate.

2. The process according to claim 1, wherein in step (a), at least one of said at least two reactant solutions further comprises an adjuvant reactant and/or a dispersing agent.

3. The process according to claim 2, wherein in step (a), one or more adjuvant reactant solutions comprising at least one selected from a group consisting of a dispersing agent, an adjuvant reactant and a pH adjuster.

4. The process according to claim 1, wherein in step (a), said two reactant solutions A and B are each independently aqueous solutions or organic solutions.

5. The process according to claim 4, wherein said aqueous solutions or organic solutions are at a temperature from 15° C. to the boiling point of the solutions.

6. The process according to claim 1, wherein in step (b), said reactant solutions are rapidly dispersed and pulverized to micro-liquid aggregates in finely divided form in the mixing and reaction precipitator.

7. The process according to claim 1, wherein the residence time of said reactant solutions in said mixing reactor is from 0.1 second to 120 seconds.

8. The process according to claim 7, wherein the residence time of said reactant solutions in said mixing reactor is from 0.1 second to 10 seconds.

9. The process according to claim 1, wherein said tubular ejection mixing reactor is selected from a group consisting of a coaxial ejection mixing and reacting precipitator, an ejection mixing reactor having a side inlet and a multi-nozzle ejection mixing reactor.

10. The process according to claim 1, wherein the inner diameter of the hole for ejecting is from 0.5 mm to 10 mm.

11. The process according to claim 1, wherein the flux of the ejected liquid is 0.1–3000 m³/h.

12. The process of claim 11, wherein the flux of the ejected liquid is 0.1–800 m³/h.

13. The process according to claim 1, wherein the pressure of the ejected liquid is 30–3000 kg/cm².

14. The process according to claim 13, wherein the pressure of the ejected liquid is 50–1,000 kg/cm².

15. The process according to claim 1, wherein Re of the ejected liquid is 2000–20000.

16. The process according to claim 15, wherein Re of the ejected liquid is 2,000–8,000.

17. The process according to claim 1, wherein the diameter of the large diameter pipe in said tubular ejection mixing reactor is 5–1000 mm.

18. The process according to claim 17, wherein the diameter of the large diameter pipe in said tubular ejection mixing reactor is 5–500 mm.

19. The process according to claim 1, wherein Re of the second reaction liquid stream and mixing liquid stream is 3000–10000.

20. The process according to claim 19, wherein Re of the second reaction liquid stream and mixing liquid stream is 4,000–8,000.

21. The process according to claim 1, wherein a mixing member capable of rapidly dispersing and pulverizing the reactant solutions to micro-liquid aggregates in finely divided form is provided in said tubular static mixing reactor in step (b).

22. The process according to claim 21, wherein the inner diameter of the pipes in said tubular static mixing reactor is from 5 mm to 1,000 mm.

23. The process according to claim 22, wherein the inner diameter of the pipes in said tubular static mixing reactor is from 5 mm to 500 mm.

24. The process according to claim 21, wherein the flux of each of the reactant solutions is in the range of 0.1–3,000 m$^3$/h.

25. The process according to claim 21, wherein the inlet pressure of the solutions is 0.5–3,000 kg/cm$^2$.

26. The process according to claim 25, wherein the inlet pressure of the solutions is 2–1,000 kg/cm$^2$.

27. The process according to claim 21, wherein Re of the reactant solution stream and mixing liquid stream is 3,000–20,000.

28. The process according to claim 27, wherein Re of the reactant solution stream and mixing liquid stream is 3,000–8,000.

29. The process according to claim 21, wherein the pressure of the liquid stream is 20–500 kg/cm$^2$, when said first or second atomizer is a pressure nozzle.

30. The process according to claim 29, wherein the pressure of the liquid stream is 20–300 kg/cm$^2$, when said atomizer is a pressure nozzle.

31. The process according to claim 21, wherein the pressure of the pressured gas is 3–50 kg/cm$^2$, when said first or second atomizer is a gas stream nozzle.

32. The process according to claim 31, wherein the pressure of the pressured gas is 3–20 kg/cm$^2$, when said atomizer is a gas stream nozzle.

33. The process according to claim 1, wherein said atomization mixing reactor comprises:
(a) at least one, first atomizer capable of making a reactant solution to an oriented atomized gas stream;
(b) at least one second atomizer capable of making at least one of the remaining reactant solutions to an oriented atomized gas stream; and
(c) a roller or transfer belt carrying and transferring the reaction precipitate for the intersection and overlapping of different liquid micro-liquid droplets at the same one region so as to achieve the mixing of micro-liquid aggregates with each other;

and wherein said first atomizer and said second atomizer spray the reactant solutions separately onto the roller or transfer belt in one direction.

34. The process according to claim 33, wherein the size of the sprayed droplets is 20–300 μm.

35. The process according to claim 33, wherein the flows of the reactant solutions A and B are independently 0.1–3,000 m$^3$/h.

36. The process according to claim 35, wherein the flows of the reactant solutions A and B are independently 0.1–800 m$^3$/h.

37. The process according to claim 33, wherein said atomization mixing reactor further comprises a third atomizer capable of making said adjuvant reactant solution to an oriented atomized gas stream.

38. The process according to claim 33, wherein a filter device is provided on said transfer belt.

39. The process according to claim 38, wherein said filter device is a wet filter cloth.

40. The process according to claim 33, further comprising a step of collecting the precipitate-containing slurry from said roller or transfer belt and then post-treating the same.

41. The process according to claim 1, wherein in step (c), said precipitate-containing slurry is post treated immediately after continuously discharged from said mixing and reaction precipitator.

42. The process according to claim 1, wherein the process steps in said step (c) comprise separation, drying and pulverization.

43. The process according to claim 42, wherein said separation step comprises rinsing and filtering.

44. The process according to claim 42, wherein said drying step further comprises azeotropic distillation.

45. The process according to claim 1, wherein in said step (c), said precipitate-containing slurry is firstly subject to aging and then other post treatment after discharged continuously from the mixing and reaction precipitator to produce nano-particle loose aggregate powder.

46. The process according to claim 1, wherein said nano-powders and nano-particle loose aggregate powders are one or more selected from a group consisting of metals, oxides, hydroxides, salts, phosphides and sulfides, or organic compounds.

* * * * *